United States Patent Office 3,792,072
Patented Feb. 12, 1974

3,792,072
SILYLATING AGENT
Richard Newton Lewis, Tecumseh, Mich., assignor to Stauffer Chemical Company, Adrian, Mich.
No Drawing. Filed Dec. 30, 1971, Ser. No. 214,407
Int. Cl. C07f 7/08
U.S. Cl. 260—448.2 E          6 Claims

ABSTRACT OF THE DISCLOSURE

A silylating agent is described which comprises a disilazane and an acyloxysilane, and a method for converting silanols and siloxanols to their trimethylsilyl derivatives.

This invention relates to a silylating agent, particularly to a silylating agent for silanols and siloxanols, and to a method for converting silanols and siloxanols to their silyl derivatives.

Silylation is a well-known and very useful method of converting organic compounds containing active hydrogen to their trimethylsilyl derivatives. See A. E. Pierce, "Silylation of Organic Compounds," published by Pierce Chemical Company in 1968. The method is of particular utility for compounds that cannot be distilled because of instability or high molecular weight or both. Silylation converts them to stable, volatile compounds that can be identified by chromatographic techniques, especially by gas chromatography. Groups that can be silylated by the proper choice of silylating agent include alcohols, phenols, carboxylic acids, amines, amides, imides, oximes, and thiols.

Although various silylating agents have been used successfully with organic compounds, these agents are relatively ineffective or cause difficulties when used in converting silanols and siloxanols to the silyl derivatives. Thus hexamethyldisilazane, which is effective for alcohols, carboxylic acids, and amines, is relatively ineffective for silanols. There is essentially no reaction at room temperature, and only a slow reaction at temperatures as high as 100° C. or more. Although the addition of polar aprotic solvents, such as dimethyl formamide or dimethylsulfoxide, has a slight effect on the reaction rate, such solvents are difficult to remove from the silylated product.

When trimethylchlorosilane is used as a silylating agent, it reacts rapidly with silanols to produce anhydrous hydrogen chloride as a by-product, which converts part of the silanol to undesirable condensation products. Although the reaction proceeds more smoothly in the presence of acid acceptors such as pyridine and trimethylamine, the by-product amine hydrochlorides are difficult to remove. Furthermore, trimethylchlorosilane and acid acceptors of a grade suitable for silylation are obtained only with great difficulty and are very expensive.

Therefore, it is an object of this invention to provide a silylating agent for silanols and siloxanols. A further object of this invention is to provide a method for rapidly converting silanols and siloxanols to silyl derivatives without forming by-products that are difficult to remove.

The foregoing objects and others which will become apparent from the following description are accomplished in accordance with this invention, generally speaking, by providing a silylating agent which comprises a major proportion of a disilazane and a minor proportion of an acyloxysilane.

The disilazane may be represented by the formula $(R_3Si)_2NH$, in which R is selected from the group consisting of hydrogen, alkyl and alkenyl radicals having up to six carbon atoms, haloalkyl and cyanoalkyl radicals having up to six carbon atoms, and phenyl and mono-substituted phenyl radicals free of active hydrogen. Examples of suitable groups include methyl, ethyl, propyl, butyl, vinyl, allyl, chloromethyl, trifluoropropyl, cyanoethyl, phenyl, p-bromophenyl, p-cyanophenyl, and p-styryl.

It is generally preferred that at least four of the groups represented by R be methyl groups. Examples of suitable disilazanes are tetramethyldisilazane, hexamethyldisilazane, bis-chloromethyltetramethyldisilazane, and divinyltetramethyldisilazane.

The disilazanes of this invention are easily prepared from the reaction of halosilanes of the formula $R_3SiCl$ with ammonia.

The acyloxysilanes may be represented by the formula $R'COOSiR_3$, in which R is the same as R above, and R' is hydrogen, alkyl, or haloalkyl radicals having up to 5 carbon atoms. It is preferred that at least two of the R groups be methyl, and it is further preferred that the silyl group, $R_3Si$, be the same as the silyl group in the disilazane. Thus suitable silyl groups include dimethylsilyl, dibutylsilyl, trimethylsilyl, tributylsilyl, chloromethyldimethylsilyl, and vinyldimethylsilyl.

Suitable acyloxy groups include formoxy, acetoxy, propionoxy, butyroxy, chloroacetoxy, and trifluoroacetoxy and the like. Higher acyloxy groups may lead to difficulties in isolating the desired product.

Examples of suitable acyloxysilanes include dimethylacetoxysilane, trimethylacetoxysilane, trimethylpropionoxysilane, trimethylbutyroxysilane, chloromethyldimethylchloroacetoxysilane, and vinyldimethyltrifluoroacetoxysilane.

The acyloxysilanes of this invention are easily obtained from the reaction of chlorosilanes and carboxylic acids.

The acyloxysilanes is effective in amounts of from 0.1 percent or less to as much as 25 percent or more. The preferred range is from 0.5 percent to 15 percent.

Silylation of silanols and siloxanols proceeds at a moderate rate even at room temperature, and more rapidly at higher temperatures, preferably in the range of 60–110° C. Temperatures as high as 150° C. may be used if desired, but are rarely necessary.

The following reactions are believed to take place initially; the formula $R''_3SiOH$ is used here to indicate either silanol or siloxanol:

(1) $R'COOSiR_3 + R''_3SiOH \rightarrow R_3SiOSiR''_3 + R'COOH$
(2) $3R'COOH + (R_3Si)_2NH \rightarrow$
$$2R''COOSiR_3 + R'COONH_4$$

Reactions (1) and (2) proceed until all of the acyloxysilane is converted to ammonium acylate, $R'COONH_4$. These steps constitute an initiation reaction, which may be expressed as follows:

(3) $R'COOSiR_3 + (R_3Si)_2NH + 3R''SiOH \rightarrow$
$$3R''_3SiOSiR_3 + R'COONH_4$$

The overall silylating reaction may be represented by Equation (4):

(4) $(R_3Si)_2NH + 2R''SiOH \rightarrow 2R''_3SiORSiR_3 + NH_3$

Although the acyloxysilanes are consumed rapidly their catalytic effect persists. It is believed that the by-product ammonium acylate is the active catalyst. Unlike ammonium salts of mineral acids, e.g. ammonium chloride and ammonium sulfate, the acylates are soluble at the preferred reaction temperature. For this reason trimethylacetoxysilane, which produces ammonium acetate, is a much more effective catalyst than trimethylchlorosilane, which produces ammonium chloride.

Acetoxysilanes have a particular advantage in that the resulting ammonium acetate, which is soluble in the reaction mixture at about 100° C., is only slightly soluble at room temperature. It therefore precipitates from the reaction mixture on cooling, and is easily removed, if desired, by filtration or centrifugation.

Propionoxysilanes and butyroxysilanes are preferred if it is desired to avoid the step of filtration or centrifugation, as the by-product ammonium propionate or butyrate is more soluble than the acetate. Because these salts are volatile at temperatures below 150° C., they generally do not interfere with gas-chromatographic analysis of the silylated product.

The silylating agents of this invention may be prepared by mixing a disilazane with a previously prepared acyloxysilane, or the acyloxysilane may be prepared in situ by mixing the disilazane with a carboxlic acid of the formula R'COOH to form an ammonium acylate. The silylating agent of this invention is stable over long periods of time and retains its activity even after prolonged storage.

The silylating agents of this invention may be used to convert silanols and siloxanols to their trimethylsilyl derivatives. This is particularly important in the gas chromatographic characterization of short-chain organopolysiloxane fluids containing silicon-bonded hydroxyl groups, which are unstable at elevated temperatures. Also organic compounds containing active hydrogen atoms, such as alcohols, amines and carboxylic acids, may be converted to their corresponding trimethylsilyl derivatives by the silylating agents of this invention.

Various embodiments of this invention are further illustrated by the following examples in which all parts are by weight unless otherwise specified.

EXAMPLE 1

A silylating agent is prepared by mixing at room temperature 10 parts of hexamethyldisilazane and one part of acetic acid. The mixture becomes warm and a precipitate of ammonium acetate is formed. After about 15 minutes the mixture is filtered in an inert atmosphere and a clear, stable solution is recovered. Upon exposure to moist air a precipitate of ammonium acetate is formed immediately, indicating the presence of trimethylacetoxysilane.

EXAMPLE 2

Two parts by volume of a short-chain dimethylpolysilane fluid containing 2–5 percent of silicon-bonded hydroxyl groups are mixed with 1 part by volume of the silylating agent of Example 1 and heated to 105° C. Ammonia gas is evolved and after three minutes at 105° C. the mixture is clear. The mixture is cooled to room temperature, whereupon a precipitate of ammonium acetate is formed. This is removed by filtration and the clear filtrate shows no detectable silicon-bonded hydroxyl groups on infrared analysis.

When a sample is analyzed by gas chromatography (SE–30 column, programmed from 60 to 300° C. at 10° per minute), all peaks are clear and sharp, and correspond to known compounds, mostly linear siloxanes containing up to 20 silicon atoms with trimethylsilyl end groups. Cyclic siloxanes are also observed. Peaks due to the silylating agent elute in less than 2 minutes.

EXAMPLE 3

A silylation reagent containing 99 percent by weight of hexamethyldisilazane and 1 percent by weight of trimethylpropionoxysilane is prepared. One part by volume of this silylating agent is mixed with two parts by volume of the hydroxyl-containing fluid of Example 2 and heated to 105° C. Evolution of ammonia is complete in about 5 minutes and no precipitate is formed on cooling. No OH groups are present in the clear solution as determined by sample shows the same peaks as are observed in Example 2. All peaks due to the silylation reagent are eluted in less than 3 minutes.

EXAMPLE 4

Example 3 is repeated with a silylation reagent composed of 99 percent by weight of hexamethyldisilazane and 1 percent by weight of trimethylbutyroxysilane. Similar results are obtained.

EXAMPLE 5

Ten parts of diphenylsilanediol are dissolved in 50 parts by volume of tetrahydrofuran, mixed with 10 parts by volume of the silylating agent of Example 1, and heated at reflux (70° C.) for 30 minutes. The reaction product is poured into 250 parts by volume of water. An oil layer is separated and distilled to yield about 15 parts (90 percent yield) of 1,1,1,5,5,5-hexamethyl-3,3-diphenyltrisiloxane, B.P. 174–176° C. at 20 mm.

EXAMPLE 6

A partially condensed methylphenylsiloxane resin (75 percent by weight solution in toluene) containing about 5 percent by weight of silicon-bonded hydroxyl (solvent-free basis), is heated with an equal volume of the silylating agent of Example 1 for 5 minutes at 100° C. The reaction product contains a viscous resinous material, which upon heating even to 200° C. does not cure, thus indicating that essentially all of the hydroxyl groups are silylated.

EXAMPLE 7

Ten parts of a 60,000-cp. silicone fluid containing 25 parts per million of silicon-bonded hydroxyl groups is mixed with one part of the silylating agent of Example 1, and heated for 30 minutes at 100° C. The reaction mixture is then heated for two hours at 150° C. with a nitrogen sparge to remove the unreacted silylating agent and its by-products, including ammonium acetate. The resulting fluid contains less than 5 parts per million of hydroxyl groups.

While specific embodiments of the invention have been shown and described, the invention is not limited to these particular embodiments. It is intended therefore to include all modifications within the spirit and scope of this invention.

The invention claimed is:

1. A silylating agent consisting essentially of a major amount of a disilazane represented by the formula $(R_3Si)_2NH$, and at least 0.1 percent of an acyloxysilane represented by the formula $R'COOSiR_3$, in which R is selected from the group consisting of hydrogen, alkyl and alkenyl radicals having up to six carbon atoms, haloalkyl and cyanoalkyl radicals having up to six carbon atoms, phenyl and monosubstituted phenyl radicals free of active hydrogen and R' is selected from the group consisting of hydrogen, alkyl and haloalkyl radicals having up to 5 carbon atoms.

2. A silylating agent according to claim 1 in which at least four of the R groups in the disilazane and at least two of the R groups in the acyloxsilane are methyl.

3. A silylating agent according to claim 1 in which the disilazane is hexamethyldisilazane and the acyloxsilane is trimethylacetoxysilane.

4. A silylating agent according to claim 1 in which the disilazane is hexamethyldisilazane and the acyloxysilane is trimethylpropionoxysilane.

5. A silylating agent according to claim 1 in which the disilazane is hexamethyldisilazane and the acyloxysilane is trimethylbutyroxysilane.

6. A method for silylating a silicon compound selected from the class consisting of silanols and siloxanols whose organic substituents are inert under the reaction conditions and contains at least one silicon-bonded hydroxyl group which comprises mixing the silicon compound with the silylating agent of claim 1 and heating for a period of from 3 to 30 minutes at a temperature up to 150° C.

References Cited

UNITED STATES PATENTS

| | | | |
|---|---|---|---|
| 2,746,956 | 5/1956 | Speier | 260—448.2 E X |
| 2,910,489 | 10/1959 | Bailey et al. | 260—448.2 E X |
| 3,356,758 | 12/1967 | Omietanski et al. | 260—448.2 E |

OTHER REFERENCES

Pierce: "Silylation of Organic Compounds," Pierce Chemical Co., Rockford, Ill. (1968).

DANIEL E. WYMAN, Primary Examiner

P. F. SHAVER, Assistant Examiner

U.S. Cl. X.R.

252—182; 260—448.8 R